United States Patent
Mashima et al.

(10) Patent No.: US 11,142,691 B2
(45) Date of Patent: Oct. 12, 2021

(54) RARE EARTH ALUMINATE FLUORESCENT MATERIAL, AND METHOD FOR PRODUCING THE SAME

(71) Applicant: NICHIA CORPORATION, Anan (JP)

(72) Inventors: Yasuaki Mashima, Tokushima (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 288 days.

(21) Appl. No.: 16/176,199

(22) Filed: Oct. 31, 2018

(65) Prior Publication Data

US 2019/0127637 A1 May 2, 2019

(30) Foreign Application Priority Data

Oct. 31, 2017 (JP) .............................. JP2017-211052
Oct. 26, 2018 (JP) .............................. JP2018-201603

(51) Int. Cl.
  *C09K 11/77* (2006.01)
  *G03B 21/20* (2006.01)
(52) U.S. Cl.
  CPC ........ *C09K 11/7774* (2013.01); *G03B 21/204* (2013.01)
(58) Field of Classification Search
  CPC ................................................. C09K 11/7774
  See application file for complete search history.

(56) References Cited

U.S. PATENT DOCUMENTS

| 9,429,830 B2 | 8/2016 | Nojima | |
| 2008/0197321 A1* | 8/2008 | Hirosaki | C01B 21/0821 252/301.4 R |
| 2014/0376229 A1* | 12/2014 | Tsumori | C09K 11/7774 362/293 |
| 2015/0205189 A1 | 7/2015 | Nojima | |

(Continued)

FOREIGN PATENT DOCUMENTS

| JP | H10242513 A | 9/1998 |
| JP | 2015-081313 A | 4/2015 |

(Continued)

OTHER PUBLICATIONS

Pan. Tailored photoluminescence of YAG:Ce phosphorthrough various methods. Journal of Physics and Chemistry of Solids 65 (2004) 845-850 (Year: 2004).*

*Primary Examiner* — Matthew E. Hoban
(74) *Attorney, Agent, or Firm* — Hunton Andrews Kurth LLP

(57) ABSTRACT

Provided is a rare earth aluminate fluorescent material and a method of producing the same. The rare earth aluminate fluorescent material contains at least one rare earth element Ln selected from the group consisting of Y, La, Lu, Gd, and Tb; Ce; Al; and optionally at least one element M1 selected from Ga and Sc, wherein a total molar ratio of the rare earth element Ln and Ce is 3, a total molar ratio of Al and the element M1 is a product of 5 and a parameter k in a range of 0.95 or more and 1.05 or less, and a molar ratio of Ce is a product of a parameter n in a range of 0.003 or more and (Continued)

0.017 or less and 3, and wherein a light emission peak wavelength $\lambda_p$ (nm) at an excitation wavelength of 450 nm and the parameter n satisfy $\lambda_p \geq 1590n+531$.

8 Claims, 3 Drawing Sheets

(56) References Cited

U.S. PATENT DOCUMENTS

| | | |
|---|---|---|
| 2016/0043289 A1 | 2/2016 | Inomata et al. |
| 2017/0045810 A1* | 2/2017 | Huang ............... G02B 19/0047 |
| 2017/0166811 A1* | 6/2017 | Fujioka .................... B05D 1/18 |
| 2017/0179346 A1 | 6/2017 | Inomata et al. |

FOREIGN PATENT DOCUMENTS

| | | |
|---|---|---|
| JP | 2015-138168 A | 7/2015 |
| JP | 2017-105914 A | 6/2017 |

\* cited by examiner

RARE EARTH ALUMINATE FLUORESCENT MATERIAL, AND METHOD FOR PRODUCING THE SAME

CROSS-REFERENCE TO RELATED PATENT APPLICATION

This application claims priority to Japanese Patent Application No. 2017-211052, filed on Oct. 31, 2017, and Japanese Patent Application No. 2018-201603, filed on Oct. 26, 2018, the disclosures of which is herein incorporated by reference in their entirety.

BACKGROUND

Technical Field

The present disclosure relates to a rare earth aluminate fluorescent material, and a method for producing the same. In this specification, the "fluorescent material" is used in the same meaning as a "fluorescent phosphor".

Description of Related Art

As a fluorescent material used for a light emitting element such as a light emitting diode (hereinafter, also referred to as "LED") or a semiconductor laser diode (hereinafter, also referred to as "LD"), as well as a light emitting device for in-car or general lighting, backlight for a liquid crystal display device, and a light source device for a projector, an yttrium-aluminum-garnet-based fluorescent material (hereinafter, also referred to as "YAG-based fluorescent material") containing a rare earth such as yttrium, has been known. Further, a lutetium-aluminum-garnet-based fluorescent material (hereinafter, also referred to as "LuAG-based fluorescent material") containing lutetium, has also been known. In the present specification, an aluminate fluorescent material having a garnet crystal structure containing rare earth elements, including the YAG-based fluorescent material and the LuAG-based fluorescent material, is referred to as a rare earth aluminate fluorescent material.

Among the rare earth aluminate fluorescent materials, a rare earth aluminate fluorescent material activated with Ce is excited by irradiation of electron rays, vacuum ultraviolet rays, particle rays such as blue light, or electromagnetic waves to emit from yellow to green light. Since the rare earth aluminate fluorescent material activated with Ce has a short afterglow, a clear image can be obtained. The rare earth aluminate fluorescent material activated with Ce, because of having a short afterglow, has been used for, for example, a light source device for a projector as shown in Japanese Unexamined Patent Publication No. 2015-138168.

However, as to the rare earth aluminate fluorescent material activated with Ce, when the light density of excitation light is increased by more than a certain value in the light emitting device or the light source device, the light emitting process of the fluorescent material cannot follow the increase of the excitation energy density, so that the fluorescent material tends to cause luminance saturation. Since a laser light source has very high light density, the rare earth aluminate fluorescent material irradiated at a specific laser output causes luminance saturation when increasing the laser output, and the light emission intensity is significantly decreased. FIG. 5 is an image figure showing, in the case where the fluorescent material is irradiated with a semiconductor laser, a relationship between a laser output to be irradiated on the fluorescent material and a light emission intensity of the fluorescent material, and how the luminance of the fluorescent material is saturated with the laser output. As shown in FIG. 5, in the rare earth aluminate fluorescent material activated with Ce, when the laser output as excitation light is increased, the light emission intensity is linearly increased, but when the laser output exceeds the saturation luminance, the light emission intensity is significantly decreased. Thus, a rare earth aluminate fluorescent material having linearly high growth of an output of the light emission intensity relative to an input of the excitation light; and having high saturation luminance, is desired.

Accordingly, an embodiment of the present disclosure has an object to provide a rare earth aluminate fluorescent material capable of enhancing saturation luminance, and a method of producing the same.

SUMMARY

Means for solving the above problems includes the following embodiments.

A first embodiment of the present disclosure is a rare earth aluminate fluorescent material, comprising at least one rare earth element Ln selected from the group consisting of Y, La, Lu, Gd, and Tb; Ce; Al; and optionally at least one element M1 selected from Ga and Sc, and having a composition of the rare earth aluminate fluorescent material, in which a total molar ratio of the rare earth element Ln and Ce is 3, a total molar ratio of Al and the element M1 is a product of 5 and a parameter k in a range of 0.95 or more and 1.05 or less, and a molar ratio of Ce is a product of a parameter n in a range of 0.003 or more and 0.017 or less and 3, wherein a light emission peak wavelength $\lambda_p$ (nm) at an excitation wavelength of 450 nm and the parameter n satisfy a relational expression of $\lambda_p \geq 1590n + 531$.

A second embodiment of the present disclosure is a method for producing the rare earth aluminate fluorescent material, comprising:

first calcining a first raw material mixture to obtain a first calcined product, in which the first raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting the charge-in composition such that the total molar ratio of the rare earth element Ln and Ce is 3, the total molar ratio of Al and the element M1 is 5, and the molar ratio of Ce is a product of a parameter n in a range of 0.003 or more and 0.017 or less and 3, and at least one time of second calcining a mixture to obtain a second calcined product, in which the mixture contains the first calcined product and a second raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting the charge-in composition such that the total molar ratio of the rare earth element Ln and Ce is 3, the total molar ratio of Al and the element M1 is 5, and the molar ratio of Ce is a product of a parameter n in a range of 0.003 or more and 0.017 or less and 3.

In accordance with the embodiments of the present disclosure, a rare earth aluminate fluorescent material capable of enhancing saturation luminance, and a method for producing the same, can be provided.

DETAILED DESCRIPTION

Figure 1:
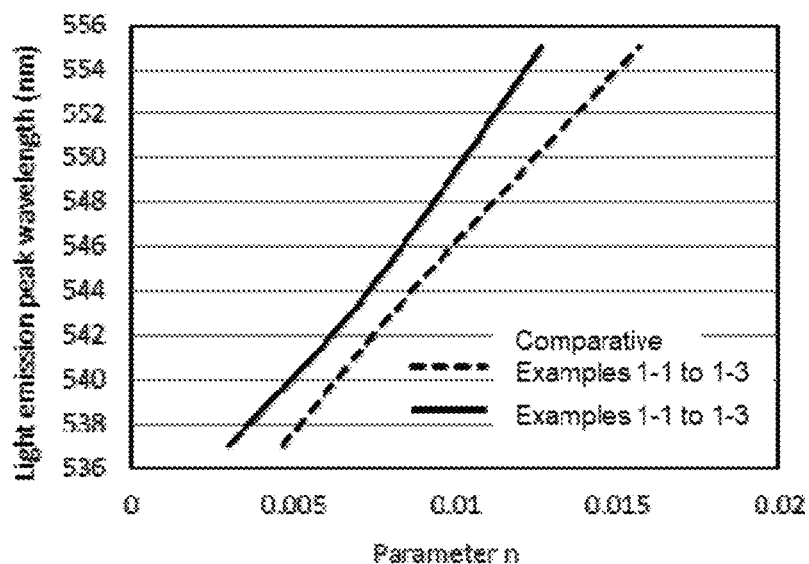
FIG. 1 is a graph in which, a relationship between a parameter n obtained by dividing a molar ratio of Ce in each of compositions of the rare earth aluminate fluorescent materials according to Examples 1-1 to 1-3 and the rare earth aluminate fluorescent materials according to Comparative Examples 1-1 to 1-3 by a total molar ratio of a rare earth element Ln and Ce, which is 3, and a light emission peak wavelength (nm) of each of the rare earth aluminate fluorescent materials is plotted.

The rare earth aluminate fluorescent material and the production method according to the present invention are described hereunder on the basis of embodiments. The embodiments shown below are exemplifications for exemplifying the technical idea of the present invention, and the present invention is not limited to the rare earth aluminate fluorescent material and the production method mentioned below. Standards according to JIS Z8110 are applied to the relations between color names and chromaticity coordinates, the relations between wavelength ranges of light and color names of monochromatic lights.

Rare Earth Aluminate Fluorescent Material

The rare earth aluminate fluorescent material according to the first embodiment comprises at least one rare earth element Ln selected from the group consisting of Y, La, Lu, Gd, and Tb; Ce; Al; and optionally at least one element M1 selected from Ga and Sc, and has a composition of the rare earth aluminate fluorescent material, in which a total molar ratio of the rare earth element Ln and Ce is 3, a total molar ratio of Al and the element M1 is a product of 5 and a parameter k in a range of 0.95 or more and 1.05 or less, and a molar ratio of Ce is a product of a parameter n in a range of 0.003 or more and 0.017 or less and 3, wherein a light emission peak wavelength $\lambda_p$ (nm) at an excitation wavelength of 450 nm and the parameter n satisfy a relational expression of $\lambda_p \geq 1590n+531$. The term 'molar ratio' in the composition of the rare earth aluminate fluorescent material refers to the molar amount of an element in one mole of the chemical composition of the rare earth aluminate fluorescent material.

When the parameter n obtained by dividing the molar ratio of Ce by the total molar ratio of the rare earth element Ln and Ce, which is 3, falls within a range of 0.003 or more and 0.017 or less in the composition of the fluorescent material, the light emission peak wavelength $\lambda_p$ (nm) at an excitation wavelength of 450 nm and the parameter n satisfy a relational expression of $\lambda_p \geq 1590n+531$, and the rare earth aluminate fluorescent material has linearly high growth of the light emission intensity relative to an output of excitation light to be irradiated on the fluorescent material and high saturation luminance. That is, when the light emission peak wavelength $\lambda_p$ at an excitation wavelength of 450 nm is a fixed value, in the rare earth aluminate fluorescent material in which the value of the parameter n obtained by dividing the molar ratio of Ce in the composition of the rare earth aluminate fluorescent material by the total molar ratio of the rare earth element Ln and Ce, which is 3, is a small value so as to satisfy a relational expression of $\lambda_p \geq 1590n+531$, the luminance saturation is mitigated, so that the saturation luminance of the rare earth aluminate fluorescent material becomes high. When the value of the parameter n is small in the composition of the rare earth aluminate fluorescent material, the saturation luminance becomes high, but the light emission peak wavelength of the rare earth aluminate fluorescent material tends to be short. In the rare earth aluminate fluorescent material, the light emission peak wavelength $\lambda_p$ (nm) and the parameter n satisfy a relational expression of $\lambda_p \geq 1590n+531$. That is, in order to enhance the saturation luminance, a shift of the light emission peak wavelength toward the short wavelength side can be suppressed even when reducing the molar ratio of Ce contained in the composition of the fluorescent material. When the parameter n is less than 0.003 in the composition of the rare earth aluminate fluorescent material, the activation amount of Ce is too small, so that sufficient light emission luminance cannot be obtained. When the parameter n is more than 0.017 in the composition of the rare earth aluminate fluorescent material, the activation amount of Ce becomes too large, so that the concentration quenching easily occurs, and the saturation luminance cannot be enhanced in some cases even when the light emission peak wavelength $\lambda_p$ and the parameter n satisfy a relational expression of $\lambda_p \geq 1590n+531$.

In the composition of the rare earth aluminate fluorescent material, in order to improve the luminance saturation of the light emission intensity relative to an input of excitation light in the case of using the rare earth aluminate fluorescent material for a light emitting device, the parameter n preferably falls within a range of 0.003 or more and 0.016 or less, more preferably a range of 0.003 or more and 0.015 or less.

The composition of the rare earth aluminate fluorescent material is preferably represented by the following formula (I-1):

$$(Ln_{1-n}Ce_n)_3(Al_{1-m}M1_m)_{5k}O_{12} \qquad (I\text{-}1)$$

wherein Ln represents at least one rare earth element selected from the group consisting of Y, La, Lu, Gd, and Tb, M1 represents at least one element selected from Ga and Sc, and parameters k, n, and m each satisfy $0.95 \leq k \leq 1.05$, $0.003 \leq n \leq 0.017$, and $0 \leq m \leq 0.02$.

In the rare earth aluminate fluorescent material having the composition represented by the formula (I-1), the light emission peak wavelength $\lambda_p$ (nm) at an excitation wavelength of 450 nm and the parameter n satisfy a relational expression of $\lambda_p \geq 1590n+531$, and the rare earth aluminate fluorescent material has linearly high growth of the light emission intensity relative to an input of excitation light to be irradiated on the rare earth aluminate fluorescent material and high saturation luminance.

In the composition of the rare earth aluminate fluorescent material, the rare earth element Ln is an element constituting a crystal structure having a garnet structure, together with Al and optionally at least one element M1 selected from Ga and Sc. In the composition of the rare earth aluminate fluorescent material, the rare earth element Ln preferably contains at least one element selected from the group consisting of Y, Lu, and Tb, more preferably at least one element selected from Y and Lu, even more preferably Y. In the composition of the rare earth aluminate fluorescent material, when the rare earth element Ln contains Y, a light emission spectrum containing yellow can be obtained.

In the composition of the rare earth aluminate fluorescent material, Ce is an activating element, and the parameter n is an activation amount of the activating element. In the composition of the rare earth aluminate fluorescent material, the parameter n, which is a value obtained by dividing the molar ratio of Ce contained in the rare earth aluminate fluorescent material by the total molar ratio of the rare earth element Ln and Ce, which is 3, preferably falls within a range of 0.003 or more and 0.017 or less. In the composition of the rare earth aluminate fluorescent material, when the light emission peak wavelength $\lambda_p$ (nm) at an excitation wavelength of 450 nm and the parameter n satisfy a relational expression of $\lambda_p \geq 1590n+531$, the parameter n satisfies $0.003 \leq n \leq 0.017$, preferably satisfies $0.003 \leq n \leq 0.016$, more preferably $0.003 \leq n \leq 0.015$.

In the composition of the rare earth aluminate fluorescent material, at least one element M1 selected from Ga and Sc, which is optionally contained therein, may form a crystal framework having a garnet structure, together with Al. The element M1 preferably contains Ga. In the composition of the rare earth aluminate fluorescent material, the parameter m is a value obtained by dividing the molar ratio of the element M1 by the total molar ratio of Al and the element M1, which is 5k. The parameter m may be 0, or may satisfy $0 < m \leq 0.02$. In the composition of the rare earth aluminate fluorescent material, when the parameter m satisfies $0 \leq m \leq 0.02$, a rare earth aluminate fluorescent material having a stable garnet structure and desired light emission luminance can be made.

In the composition of the rare earth aluminate fluorescent material, the parameter k is a coefficient of the total molar ratio of Al and the element M1, which is 5, and in the composition of the rare earth aluminate fluorescent material, the total molar ratio of Al and the element M1 may be less than 5 or more than 5. From the viewpoint of stability of the crystal structure, the parameter k is preferably in a range of 0.95 or more and 1.05 or less, more preferably in a range of 0.98 or more and 1.02 or less, even more preferably 0.99 or more and 1.01 or less.

An average particle diameter (Fisher Sub-Sieve Sizer's number), as measured according to a Fisher Sub-Sieve Sizer (FSSS) method, of the rare earth aluminate fluorescent material is preferably 15 µm or more. When the average particle diameter, as measured according to the FSSS method, is 15 µm or more, the rare earth aluminate fluorescent material has desired high light emission luminance.

The average particle diameter, as measured according to the FSSS method, of the rare earth aluminate fluorescent material is more preferably 16 µm or more, even more preferably 17 µm or more, still more preferably 18 µm or more. A larger average particle diameter of the rare earth aluminate fluorescent material is preferred, but in order to obtain high saturation luminance relative to an input of excitation light to be irradiated on the rare earth aluminate fluorescent material and a uniform color tone even through excitation in laser light having high light density, the average particle diameter, as measured according to the FSSS method, of the rare earth aluminate fluorescent material may be 50 µm or less, and preferably 40 µm or less.

The rare earth aluminate fluorescent material can have a plurality of layers containing the composition of the rare earth aluminate fluorescent material in a cross sectional view of the fluorescent material particles. The plurality of layers in a cross sectional view of the fluorescent material particles can be formed by a first calcined product obtained by a first calcination step and at least one time of a second calcination step using the first calcined product, according to the production method to be described below.

Method of Producing Rare Earth Aluminate Fluorescent Material

The method for producing the rare earth aluminate fluorescent material according to the second embodiment comprises a first calcination step, in which a first raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting the charge-in composition such that the total molar ratio of the rare earth element Ln and Ce is 3, the total molar ratio of Al and the element M1 is 5, and the molar ratio of Ce is a product of a parameter n in a range of 0.003 or more and 0.017 or less and 3, is calcined to thereby obtain a first calcined product, and at least one time of a second calcination step, in which a mixture containing the first calcined product and a second raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting the charge-in composition such that the total molar ratio of the rare earth element Ln and Ce is 3, the total molar ratio of Al and the element M1 is 5, and the molar ratio of Ce is a product of a parameter n in a range of 0.003 or more and 0.017 or less and 3, is calcined to thereby obtain a second calcined product.

Preparation Step of First Raw Material Mixture or Second Raw Material Mixture

As raw materials, a compound containing at least one rare earth element Ln selected from the group consisting of Y, La, Lu, Gd, and Tb; a compound containing Ce; a compound containing Al; and optionally a compound containing at least one element M1 selected from Ga and Sc, can be used. A first raw material mixture or a second raw material mixture is prepared using these compounds. In the present specification, the first raw material mixture refers to a raw material mixture not containing a calcined product of calcining the first raw material mixture. In the present specification, the second raw material mixture refers to a raw material mixture containing a first calcined product or a second calcined product to be described later.

Examples of the compound containing the rare earth element Ln, the compound containing Ce, the compound containing Al, and the compound containing at least one element M1 selected from Ga and Sc may include an oxide and a metal salt. Examples of the metal salt may include an oxalate, a carbonate, a chloride, a nitrate, and a sulfate. The compounds to be used as the raw materials may be in the form of a hydrate.

Specific example of the oxide may include $Y_2O_3$, $La_2O_3$, $Lu_2O_3$, $Gd_2O_3$, $Tb_4O_7$, $CeO_2$, $Al_2O_3$, $Ga_2O_3$, and $Sc_2O_3$.

Specific example of the metal salt may include $YCl_3$, $Y_2(C_2O_4)_3$, $Y_2(CO_3)_3$, $Y(NO_3)_3$, $Y_2(SO_4)_3$, $LaCl_3$, $La_2$ (C₂O₄)₃, La₂(CO₃)₃, La(NO₃)₃, La₂(SO₄)₃, LuCl₃, Lu₂(C₂O₄)₃, Lu(NO₃)₃, Lu₂(SO₄)₃, GdCl₃, TbCl₃, CeCl₃, Ce₂(SO₄)₃, AlCl₃, Al(NO₃)₃, Al₂(SO₄)₃, GaCl₃, Ga(NO₃)₃, ScCl₃, and Sc(NO₃)₃.

In the first raw material mixture or the second raw material mixture, the raw materials are adjusted such that, as a charge-in composition, the total molar ratio of the rare earth element Ln and Ce is 3, the total molar ratio of Al and the element M1 is 5, and the molar ratio of Ce is a product of a parameter n in a range of 0.003 or more and 0.017 or less and 3. In the first raw material mixture or the second raw material mixture, the compound containing Ce is preferably adjusted such that, as a charge-in composition, the molar ratio of Ce is a product of a parameter n in a range of 0.003 or more and 0.016 or less and 3, and more preferably, the compound containing Ce is adjusted such that the molar ratio of Ce is a product of a parameter n in a range of 0.003 or more and 0.015 or less and 3.

In the first raw material mixture or the second raw material mixture, in the case of using a compound containing the element M1, the raw materials are preferably adjusted and mixed such that, as a charge-in composition, the molar ratio of the element M1 is a product of a parameter m in a range of 0 or more and 0.02 or less and 5. The first raw material mixture or the second raw material mixture may not contain a compound containing the element M1.

In the first raw material mixture or the second raw material mixture, the raw materials are preferably mixed such that the charge-in composition is represented by the following formula (I-2):

$$(Ln_{1-n}Ce_n)_3(Al_{1-m}M1_m)_5O_{12} \qquad (I\text{-}2)$$

wherein Ln represents at least one rare earth element selected from the group consisting of Y, La, Lu, Gd, and Tb, M1 represents at least one element selected from Ga and Sc, and parameters n and m each satisfy $0.003 \leq n \leq 0.017$ and $0 \leq m \leq 0.02$.

In the first raw material mixture or the second raw material mixture, by mixing the raw materials such that the charge-in composition is represented by the formula (I-2), a rare earth aluminate fluorescent material having desired light emission luminance can be obtained. The first raw material mixture or the second raw material mixture preferably contains a compound containing Y.

The first raw material mixture or the second raw material mixture preferably contains a compound containing at least one element selected from the group consisting of Ba, Sr, Ca, Mg, and Mn as a flux in an amount of 0.5% by mass or more and 10% by mass or less. The first raw material mixture or the second raw material mixture in the first calcination step and/or the second calcination step preferably contains the compound as the flux in an amount of in a range of 0.5% by mass or more and 10% by mass or less. When a flux is contained in the first raw material mixture or the second raw material mixture, the reaction among the first raw materials or the second raw material mixture is promoted, and a solid phase reaction is easy to advance more uniformly. In this regard, it may be considered that the temperature at which the first raw material mixture or the second raw material mixture is calcined is substantially the same as or higher than the formation temperature of a liquid phase of a halide to be used as the flux, so that the reaction could be promoted.

The compound containing at least one element selected from the group consisting of Ba, Sr, Ca, Mg, and Mn to be used as the flux is preferably a halide. The compound to be used as the flux is, among halides, preferably a fluoride and/or a chloride, more preferably a fluoride. The compound to be used as the flux is even more preferably BaF₂. This is because by using BaF₂ as the flux, the garnet crystal structure of the rare earth aluminate fluorescent material becomes stable, and a composition of the garnet crystal structure is readily formed. In the compound to be used as the flux, when the total amount of the first raw material mixture or the second raw material mixture including the flux is set as 100% by mass, the content of the compound as the flux is preferably in a range of 0.5% by mass or more and 10% by mass or less. When the content of the flux contained in the first raw material mixture or the second raw material mixture falls within the aforementioned range, the reaction among the first raw material or the second raw material mixture is more promoted, and a solid phase reaction is advanced furthermore uniformly, so that a rare earth aluminate fluorescent material having a target composition is easily obtained. When the total amount of the first raw material mixture or the second raw material mixture including the flux is set as 100% by mass, the content of the flux contained in the first raw material mixture or the second raw material mixture is more preferably in a range of 1.0% by mass or more and 8.0% by mass or less, even more preferably in a range of 1.5% by mass or more and 7.0% by mass or less.

For the first raw material mixture or the second raw material mixture, the raw materials are weighed and adjusted in a target charge-in composition, and may subsequently be ground and mixed using a dry-type grinder such as a ball mill, a vibration mill, a hammer mill, a roll mill, or a jet mill; may be ground and mixed using a mortar, a pestle; may be mixed using a mixing machine such as a ribbon blender, a Henschel mixer, or a V-shaped blender; or may be ground and mixed using both the dry-type grinder and the mixing machine. The mixing may be dry-type mixing, or may also be wet-type mixing with a solvent added thereto. The dry-type mixing is preferred. This is because the processing time can be shortened more in the dry-type mixing than in the wet-type mixing, thereby leading to productivity improvement.

First Calcination Step

The first calcination step is a step of calcining the first raw material mixture to obtain a first calcined product. In the present specification, the first calcined product refers to a product obtained by calcining raw materials not containing a calcined product. In the first calcination step, the first raw material mixture is disposed in a crucible or a boat formed of carbo material such as graphite, boron nitride (BN), aluminum oxide (alumina), tungsten (W), or molybdenum (Mo), and the first calcination can be then performed. For the first calcination, for example, an electric furnace or a gas furnace may be used.

The calcination temperature in the first calcination step is, from the viewpoint of stability of the crystal structure of a first calcined product to be obtained, preferably in a range of 1,400° C. or more and 1,800° C. or less, more preferably in a range of 1,450° C. or more and 1,700° C. or less.

The calcination time in the first calcination step differs depending on the heating rate, the heat treatment atmosphere, and after reaching at the calcination temperature, the calcination time is preferably 1 hour or more, more preferably 3 hours or more, even more preferably 5 hours or more, and preferably 20 hours or less, more preferably 18 hours or less, even more preferably 15 hours or less. The calcination time in the first calcination step is, after reaching at the calcination temperature, preferably in a range of 5 hours or more and 20 hours or less, more preferably in a range of 8 hours or more and 15 hours or less.

The atmosphere in the first calcination step is preferably a reducing atmosphere. The reducing atmosphere is preferably a reductive hydrogen gas-containing nitrogen atmosphere. The amount of hydrogen gas in the reducing atmosphere is preferably 1% by volume or more, more preferably 5% by volume or more, even more preferably 10% by volume or more. The amount of nitrogen gas in the reducing atmosphere is preferably 70% by volume or more, more preferably 80% by volume or more, even more preferably 90% by volume or more. The first raw material mixture can be more reactive in a highly reductive atmosphere, so that a first calcined product can be obtained by calcining the first raw material mixture under an atmospheric pressure without applying pressure. Also, by calcining the raw material mixture in a highly reductive atmosphere, tetravalent Ce ($Ce^{4+}$) is reduced into trivalent Ce ($Ce^{3+}$), and thus a first calcined product, in which the proportion of the trivalent Ce capable of contributing toward light emission increases in the first calcined product, can be obtained.

Dispersion Treatment Step

It is preferable that the obtained first calcined product is wet dispersed and subjected to a dispersion treatment step containing wet-type sieving and sedimentary classification. Specifically, it is preferable that the obtained first calcined product is wet dispersed and subjected to a wet-type sieving to eliminate coarse particles, and then sedimentary classification is performed to eliminate fine particles. The sedimentary classification may be performed more than once, and the number of times of the sedimentary classification is preferably 20 times or less from the viewpoint of improving the productivity. The particle diameter of the obtained first calcined product can be made uniform by the dispersion treatment. As an aqueous medium to be used in the wet-type dispersion, water can be used. For the wet-type dispersion, a dispersion medium such as an alumina ball or a zirconia ball may be used. In addition, the wet-type dispersion time is, in consideration of the productivity, preferably in a range of 4 hours or more and 50 hours or less, more preferably in a range of 5 hours or more and 40 hours or less.

Acid Washing Treatment Step

The obtained first calcined product may be subjected to an acid washing treatment. The first calcined product may be subjected to an acid washing treatment after the dispersion treatment. In the first calcined product, impurities adhering on a surface of the first calcined product are removed by the acid washing treatment. For the acid washing, a hydrochloric acid solution is preferably used since it is easily available and inexpensive. The concentration of hydrochloric acid contained in the hydrochloric acid solution is preferably a concentration causing no influence on the crystal structure of the first calcined product, and preferably in a range of 1% by mass or more and 20% by mass or less, more preferably in a range of 5% by mass or more and 18% by mass or less.

Second Calcination Step

The second calcination step is a step, in which a mixture containing the first calcined product and a second raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting the charge-in composition such that the total molar ratio of the rare earth element Ln and Ce is 3, the total molar ratio of Al and the element M1 is 5, and the molar ratio of Ce is a product of a parameter n in a range of 0.003 or more and 0.017 or less and 3, is calcined to thereby obtain a second calcined product.

In the present specification, the second calcination step refers to a step of calcining a calcined product and the second raw material mixture to obtain a second calcined product. The calcined product in the second calcination step may be the first calcined product obtained by calcining the first raw material mixture, or may be the second calcined product obtained by calcining the first calcined product and the second raw material mixture. The second calcination step is performed at least once. In order to obtain a rare earth aluminate fluorescent material, which has high saturation luminance in the case of using in a light emitting device, capable of suppressing a shift of the light emission peak wavelength toward the short wavelength side even when decreasing the molar ratio of Ce contained in the composition of the fluorescent material, the second calcination step is preferably performed more than once. From the viewpoint of productivity improvement, the second calcination step is preferably performed twice.

As for the second calcined product obtained by the second calcination step, the first calcined product is used as a core, and a single-layered calcined product is formed thereon through one time of the second calcination step. When the second calcination step is repeated twice, a second calcined product, in which a single-layered calcined product is formed through the second calcination step for the first time on the first calcined product serving as a core, is obtained, and through a second calcination step for the second time, a second-layered calcined product is further formed on a surface of the single-layered second calcined product using the first calcined product as a core.

The second calcined product may be one in which a single-layered second calcined product is formed through the second calcination step by calcining a mixture containing the first calcined product and the second raw material mixture and using the first calcined product as a core, or may be one in which a second calcined product having two layers or more is formed in each second calcination steps by performing the second calcination step more than once and using the first calcined product as a core. In the present specification, when the second calcination step is repeated more than once, even the calcined product obtained through, for example, the second calcination step for the second time is referred to as a second calcined product, and even the calcined product obtained through, for example, the second calcination step for the third time is referred to as a second calcined product.

The rare earth aluminate fluorescent material to be obtained can have a plurality of layers containing a composition of the rare earth aluminate fluorescent material in a cross sectional view of the fluorescent material particles obtained by a first calcined product obtained by a first calcination step and at least one time of a second calcination step using the first calcined product.

It may be considered that by obtaining a fluorescent material having a relatively large particle diameter by performing a plurality of calcinations, crystallinity of the fluorescent material can be enhanced, as compared with a case where a fluorescent material having a relatively large particle diameter is obtained only by one time calcination, and thus one suitable for a fluorescent material for LD, which requires particularly high crystallinity, can be obtained.

It is presumed that by performing the second calcination step by using the first calcined product obtained by the first calcination step as a core, a rare earth aluminate fluorescent material having a relatively large particle diameter, in which Ce is diffused in the core, can be obtained. It is presumed that when the second calcination step is performed by using the first calcined product as a core, Ce is more diffused in a garnet structure of the first calcined product to be the core, so that a more uniform calcined product can be obtained in the core serving as the first calcined product. When Ce is segregated, there is a possibility that an adverse effect to the light emission characteristics due to an interaction between Ce serving as an activator and other Ce, which is caused by increasing the concentration of the topical Ce, occurs. In the rare earth aluminate fluorescent material containing the second calcined product obtained by the production method according to the second embodiment, an adverse effect to the light emission characteristics, which is caused by increasing the concentration of the topical Ce, may not occur, and the molar ratio of Ce in the composition of the rare earth aluminate fluorescent material can be decreased. Further, it is presumed that, in the second calcined product obtained by the production method according to the second embodiment, Ce is not segregated on the core serving as the first calcined product, and the second calcined product becomes more uniform. Thus, even when the molar ratio of Ce in the composition is decreased, the light emission peak wavelength is not made short, that is, the saturation luminance can be enhanced while suppressing a change of the color tone. In other words, the color tone remains the same, the molar ratio of Ce is decreased, and the saturation luminance can be enhanced. In addition, by the production method according to the second embodiment, a more uniform second calcined product can be obtained even when the molar ratio of Ce in the composition is decreased. Thus, in the rare earth aluminate fluorescent material comprising the second calcined product, the parameter n and the light emission peak wavelength $\lambda_p$ (nm) of the rare earth aluminate fluorescent material at an excitation wavelength of 450 nm satisfy a relational expression of $\lambda_p \geq 1590n+531$.

As for a second raw material mixture to be used in the second calcination step, after using a part of the raw material mixture obtained in the preparation step as the first raw material mixture in the first calcination step, a part of the other raw material mixture may be used as the second raw material mixture in the second calcination step. In the second calcination step, a second raw material mixture, in which the charge-in composition is adjusted in the same manner as the first raw material mixture obtained in the preparation step, is obtained, and the newly produced the second raw material mixture may be used in addition to the second raw material mixture obtained in the preparation step. As for raw materials of the second raw material mixture to be used in the second calcination step, raw materials the same as or similar to the raw materials used for the first raw material mixture in the preparation step are preferably used. The second raw material mixture to be used in the second calcination step is preferably adjusted so as to be a composition the same as or similar to the charge-in composition of the first raw material mixture in the preparation step. The second raw material mixture to be used in the second calcination step is preferably adjusted so as to be the charge-in composition represented by the formula (I-2). The second raw material mixture to be used in the second calcination step preferably contains a flux in the same manner as the first raw material mixture obtained in the preparation step. As for the flux, a flux the same as or similar to the one contained in the first raw material mixture in the preparation step, and in an amount the same as or similar to the amount in the first raw material mixture can be used. In the second raw material mixture to be used in the second calcination step, the raw materials can be mixed in the same way as the first raw material mixture in the preparation step.

The mixture containing the first calcined product and the second raw material mixture is put in a crucible or a boat the same as or similar to the one used in the first calcination, and then the second calcination can be performed.

In the second calcination step, a mass ratio of the first calcined product or the second calcined product to 100% by mass of the second raw material mixture is preferably in a range of 20% by mass or more and 83% by mass or less, more preferably in a range of 22% by mass or more and 73% by mass or less, even more preferably in a range of 25% by mass or more and 67% by mass or less, still more preferably in a range of 29% by mass or more and 59% by mass or less.

In the second calcination step, the mixture containing the first calcined product or the second calcined product and the second raw material mixture is disposed in a crucible or a boat formed of a material the same as or similar to the one used in the first calcination, and the second calcination can be then performed. For the second calcination, for example, an electric furnace or a gas furnace may be used.

The calcination temperature in the second calcination step is, from the viewpoint of stability of the crystal structure of a second calcined product to be obtained, preferably in a range of 1,400° C. or more and 1,800° C. or less, more preferably 1,450° C. or more and 1,700° C. or less.

The calcination time in the second calcination step differs depending on the heating rate, the heat treatment atmosphere, and after reaching at the calcination temperature, the calcination time is preferably 1 hour or more, more preferably 3 hours or more, even more preferably 5 hours or more, and preferably 20 hours or less, more preferably 18 hours or less, even more preferably 15 hours or less. The calcination time in the second calcination step is, after reaching at the calcination temperature, preferably in a range of 5 hours or more and 20 hours or less, more preferably in a range of 8 hours or more and 15 hours or less.

The atmosphere in the second calcination step is preferably a reducing atmosphere, and as to the reducing atmosphere, the second calcination is preferably performed in an atmosphere the same as or similar to the reducing atmosphere in the first calcination step.

Dispersion Treatment Step

The obtained second calcined product is preferably subjected to a dispersion treatment, in which the obtained second calcined product is wet dispersed and subjected to a wet-type sieving to eliminate coarse particles, and then sedimentary classification is performed to eliminate fine particles, in the same manner as the first calcined product. The sedimentary classification may be performed a plurality of times, and may be performed more than once in order to uniform a particle diameter of the obtained second calcined product. From the viewpoint of improving the productivity, the number of times of the sedimentary classification is preferably 20 times or less. The dispersion treatment step may be performed after the first calcination step, or may be performed after the second calcination step. The dispersion treatment step may be performed only after the second calcination step without performing the dispersion treatment step after the first calcination step. In the case where the second calcination step is performed more than twice, the dispersion treatment may be performed after the second calcination step in each second calcination steps to be performed more than twice, or the second calcination step is continuously performed a plurality of times, and then the dispersion treatment may be performed after the final second calcination step.

Acid Washing Treatment Step

The obtained second calcined product is preferably subjected to an acid washing treatment in the same manner as the first calcined product. The second calcined product is more preferably subjected to an acid washing treatment after the dispersion treatment step. In the second calcined product, impurities adhering on a surface of the second calcined product are removed by the acid washing treatment. The acid washing step may be performed after the first calcination step, or may be performed after the second calcination step. The acid washing treatment step may be performed only after the second calcination step without performing the acid washing treatment step after the first calcination step. In the case where the second calcination step is performed more than twice, the acid washing treatment may be performed after the second calcination step in each second calcination steps to be performed more than twice, or the second calcination step is continuously performed a plurality of times, and then the acid washing treatment step may be performed after the final second calcination step.

In combination with a light emitting element, the rare earth aluminate fluorescent material according to the first embodiment or the rare earth aluminate fluorescent material obtained by the production method according to the second embodiment converts light emitted from the light emitting element and can constitute a light emitting device that emits mixed light of light from the light emitting element and light that has undergone wavelength conversion by the rare earth aluminate fluorescent material. For example, a light emitting element that emits light in a wavelength range of 350 nm or more and 500 nm or less can be used as the light emitting element. For example, a semiconductor light emitting element using a nitride semiconductor ($In_XAl_YGa_{1-X-Y}N$, $0 \leq X$, $0 \leq Y$, $X+Y \leq 1$) can be used as the light emitting element. Using a semiconductor light emitting element as an excitation light source enables a high efficiency stable light emitting device that has high linearity of output relative to input and is resistant to mechanical shock to be obtained.

In combination with a laser light source, the rare earth aluminate fluorescent material according to the first embodiment or the rare earth aluminate fluorescent material obtained by the production method according to the second embodiment can constitute a light source device for a projector that converts excitation light emitted from the laser light source and converged by a dichroic mirror or a collimate optical system. As for the rare earth aluminate fluorescent material, in order to enhance the saturation luminance relative to an input of excitation light having high light density such as a laser light source, a shift of the light emission peak wavelength toward the short wavelength side can be suppressed even when reducing the molar ratio of Ce in the composition.

The rare earth aluminate fluorescent material according to the first embodiment or the rare earth aluminate fluorescent material obtained by the production method according to the second embodiment can be applied to a light source device for a projector comprising a fluorescent material unit having the rare earth aluminate fluorescent material and a light source. The fluorescent material unit to be used in the light source device for a projector has a fluorescent material layer containing, for example, the rare earth aluminate fluorescent material. The fluorescent material unit may comprise a reflective layer, a substrate, and an adhesive layer, in addition to the fluorescent material layer containing the rare earth aluminate fluorescent material. The fluorescent material unit may comprise the fluorescent material layer on a wheel substrate that is rotatably supported on a motor. The light source to be used in the light source device for a projector is preferably a semiconductor laser.

A projector using the light source device for a projector forms color image light by: separating white mixture light emitted from the light source device for a projector into a red light component, a green light component, and a blue light component by a color separation optical system comprising a dichroic mirror, a reflection mirror, a relay lens; allowing the separated color components to be incident to an image forming area of a liquid crystal panel for each color; and modulating the incident color light according to image information.

EXAMPLES

The present invention is hereunder specifically described by reference to the following Examples and Comparative Examples. The present invention is not limited to these Examples.

Examples 1-1 to 1-3

Preparation Step of First Raw Material Mixture

Yttrium oxide ($Y_2O_3$), cerium oxide ($CeO_2$), aluminum oxide ($Al_2O_3$), and gallium oxide ($Ga_2O_3$) were weighed and adjusted to be in a charge-in composition shown in Table 1. In the charge-in composition, the raw materials were adjusted such that the molar ratio of Ce was a product of the parameter n and 3, and the parameters n were 0.003, 0.008, and 0.015 respectively. Barium fluoride ($BaF_2$) as a flux was added to the adjusted raw materials, and the raw materials and the flux were mixed with a ball mill to obtain a first raw material mixture. The content of $BaF_2$ in the first raw material mixture was 2.5% by mass relative to 100% by mass of the first raw material mixture.

First Calcination Step

The obtained first raw material mixture was put in an alumina crucible, and calcined at 1,500° C. for 10 hours in a reducing atmosphere to obtain a first calcined product.

Second Calcination Step

The obtained first calcined product and a second raw material mixture, in which the charge-in composition was adjusted so as to be the same as the aforementioned charge-in composition and barium fluoride ($BaF_2$) was added as a flux, were equally mixed such that the mass ratio of the first calcined product and the second raw material mixture became 1:1. The mixture was then put in an alumina crucible, and calcined at 1,500° C. for 10 hours in a reducing atmosphere in the same manner as in the first calcination step, thereby obtaining a second calcined product. The second calcination step was repeated twice. In the second calcination step for the second time, the second calcination product and the second raw material mixture were equally mixed such that the mass ratio of these became 1:1, and the second calcination step for the second time was performed to obtain a second calcined product. The calcined product obtained by the second calcination step for the first time is the second calcined product, and the calcined product obtained by the second calcination step for the second time is also the second calcined product.

Dispersion Treatment Step

The second calcined product obtained by repeating the second calcination step twice, an alumina ball serving as a dispersion medium, and pure water were put in a container, and the second calcined product was dispersed for 30 hours while rotating the container. Thereafter, coarse particles were eliminated by performing wet-type sieving. Subsequently, sedimentary classification was performed to eliminate fine particles.
Acid Washing Treatment Step The second calcined product obtained by the sedimentary classification was acid-washed with a hydrochloric acid solution in which the concentration of hydrochloric acid was 17% by mass, washed with water, and then separated and dried to thereby obtain the second calcined product after the acid washing treatment as a rare earth aluminate fluorescent material of each of Examples 1-1 to 1-3.

Comparative Examples 1-1 to 1-3

Preparation Step of Raw Material Mixture

Yttrium oxide ($Y_2O_3$), cerium oxide ($CeO_2$), aluminum oxide ($Al_2O_3$), and gallium oxide ($Ga_2O_3$) were weighed and adjusted to be in a charge-in composition shown in Table 1. In the charge-in composition, when the molar ratio of Ce was represented by a product of the parameter n and 3, the raw materials were adjusted such that the parameters n were 0.005, 0.01, and 0.017 respectively. Barium fluoride ($BaF_2$) was added to the adjusted raw materials as a flux, and the raw materials and the flux were mixed with a ball mill to obtain a first raw material mixture. The content of $BaF_2$ in the first raw material mixture was 2.5% by mass relative to 100% by mass of the first raw material mixture.
Calcination Step The obtained first raw material mixture was put in an alumina crucible, and calcined at 1,500° C. for 10 hours in a reducing atmosphere to obtain a first calcined product.
Dispersion Treatment Step The obtained first calcined product, an alumina ball serving as a dispersion medium, and pure water were put in a container, and the first calcined product was dispersed for 6 hours while rotating the container. Thereafter, coarse particles were eliminated by performing wet-type sieving. Subsequently, sedimentary classification was performed to eliminate fine particles.
Acid Washing Treatment Step The first calcined product obtained by the sedimentary classification was acid-washed with a hydrochloric acid solution in which the concentration of hydrochloric acid was 17% by mass, washed with water, and then separated and dried to thereby obtain the first calcined product after the acid washing treatment as a rare earth aluminate fluorescent material of each of Comparative Examples 1-1 to 1-3.
Average Particle Diameter Using a Fisher Sub-Sieve Sizer Model 95 (manufactured by Fisher Scientific Inc.), the calcined product was sampled in an amount of 1 $cm^3$ in an environment where the temperature was 25° C. and the humidity was 70% RH, and packed in a dedicated tubular container, then a dry air flow was introduced therein under a constant pressure to read a specific surface area of the sample from the differential pressure, and thus the average particle diameter according to the FSSS method was calculated. The results are shown in Table 1.
Composition Analysis As for the obtained fluorescent material, the mass percentages (% by mass) of elements (Y, Ce, Al, Ga, and O) constituting the rare earth aluminate fluorescent material were measured with an inductively coupled plasma atomic emission spectrometer (ICP-AES) (product name: manufactured by Perkin Elmer Inc.), and the molar ratio of each element was calculated from the mass percentage of the element. The molar ratios of Y, Ce, Al, Ga, and O, which are shown in Table 1, are calculated values based on 3 which is the total molar ratio of Y and Ce. The value obtained by dividing the molar ratio of Ce by the total molar ratio of Y and Ce, which was 3, was defined as a parameter n. The value obtained by dividing the molar ratio of Ga by a product of the total molar ratio of Al and Ga, which was 5; and a parameter k was defined as a parameter m. The parameter k is a coefficient of 5, the product of 5 and parameter k is the total molar ratio of Al and Ga. The parameters n, m, and k are shown in Table 1. In addition, a calculated value obtained by applying the parameter n to the expression of 1590n+531, is shown in Table 1. FIG. 1 is a graph in which, in each of compositions of the rare earth aluminate fluorescent materials according to Examples 1-1 to 1-3, a relationship between the parameter n obtained by dividing the molar ratio of Ce by the total molar ratio of Y and Ce, which is 3, and the light emission peak wavelength $\lambda_p$ is plotted; and is a graph in which, in each of compositions of the rare earth aluminate fluorescent materials according to Comparative Examples 1-1 to 1-3, a relationship between the parameter n obtained by dividing the molar ratio of Ce by the total molar ratio of Y and Ce, which is 3, and the light emission peak wavelength (nm) is plotted.
Light Emission Peak Wavelength As for the rare earth aluminate fluorescent material according to each of Examples 1-1 to 1-3 and the rare earth aluminate fluorescent material according to each of Comparative Examples 1-1 to 1-3, using a quantum efficiency measuring apparatus (QE-2000, manufactured by Otsuka Electronics Co., Ltd.), each fluorescent material was irradiated with light having an excitation wavelength of 450 nm to measure the light emission spectrum thereof at room temperature (25° C.±5° C.), and the wavelength at which the light emission spectrum was maximum was measured as a light emission peak wavelength (nm). The results are shown in Table 1.
Light Emission Intensity (%)

Figure 2:
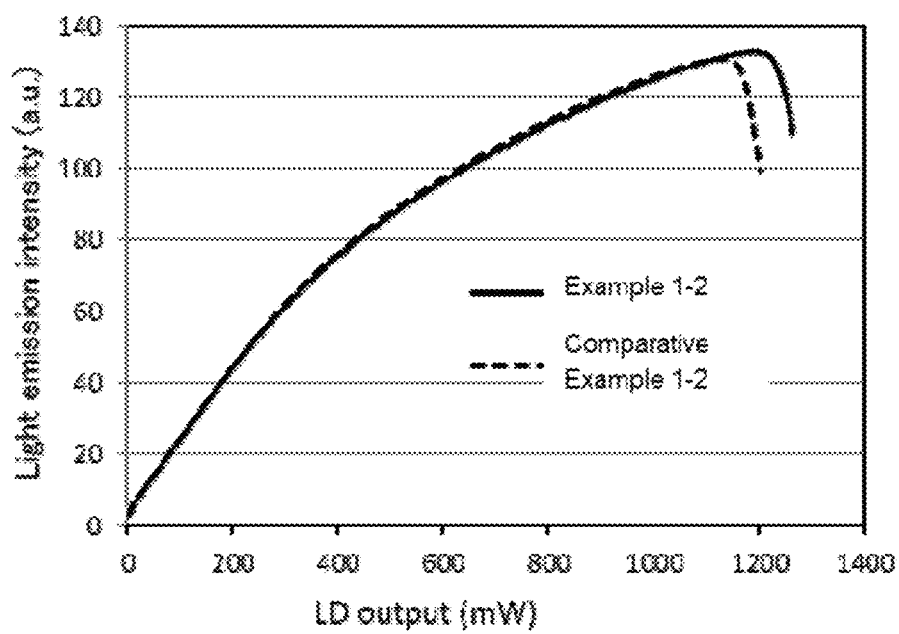
FIG. 2 is a graph showing a relationship between an output of a laser diode (LD output) to be irradiated on the fluorescent material and a light emission intensity of each of the fluorescent materials according to Example 1-2 and Comparative Example 1-2.
Figure 3:
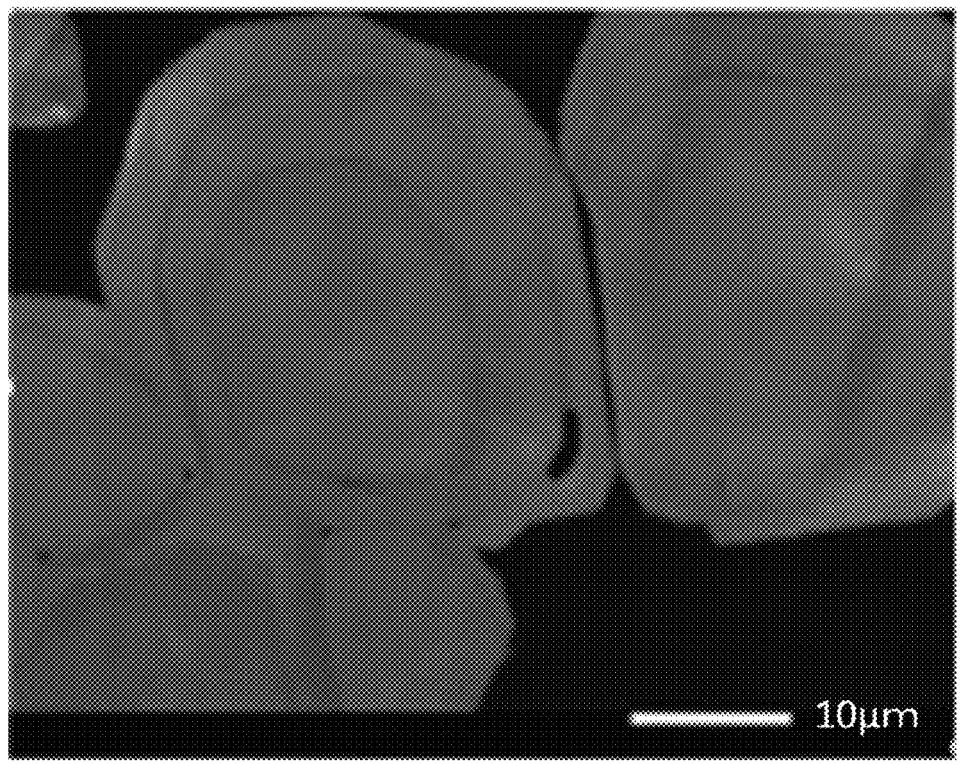
FIG. 3 is a scanning electron microscope (SEM) micrograph showing a cross section of the rare earth aluminate fluorescent material according to Example 1-2.
Figure 4:
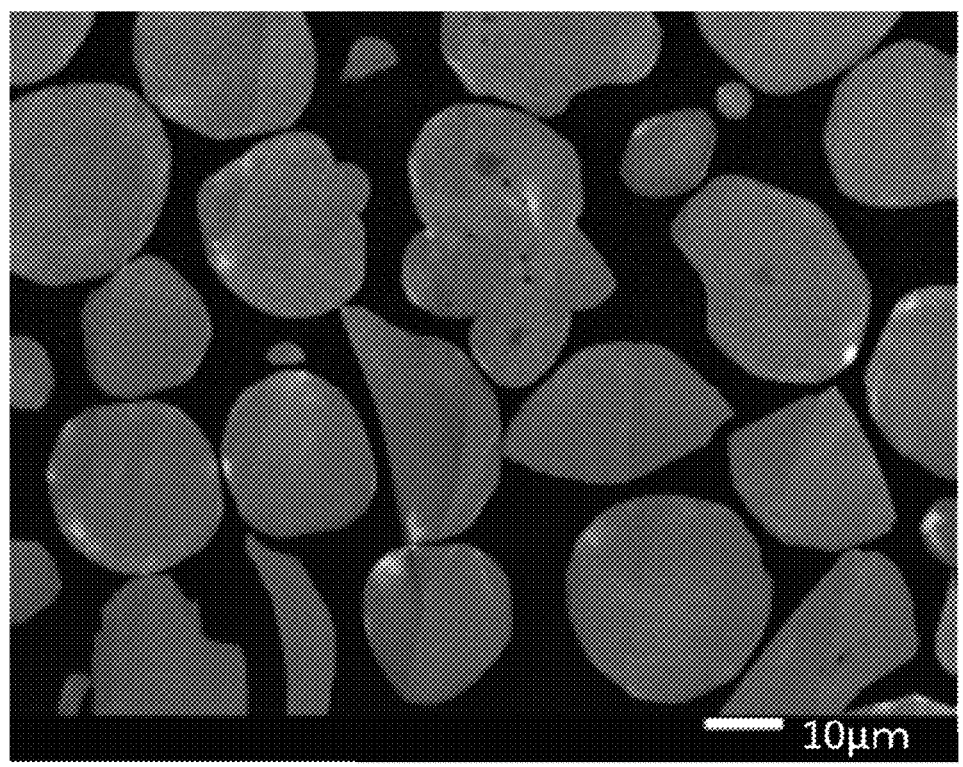
FIG. 4 is a SEM micrograph showing a cross section of the rare earth aluminate fluorescent material according to Comparative Example 1-2.
Figure 5:
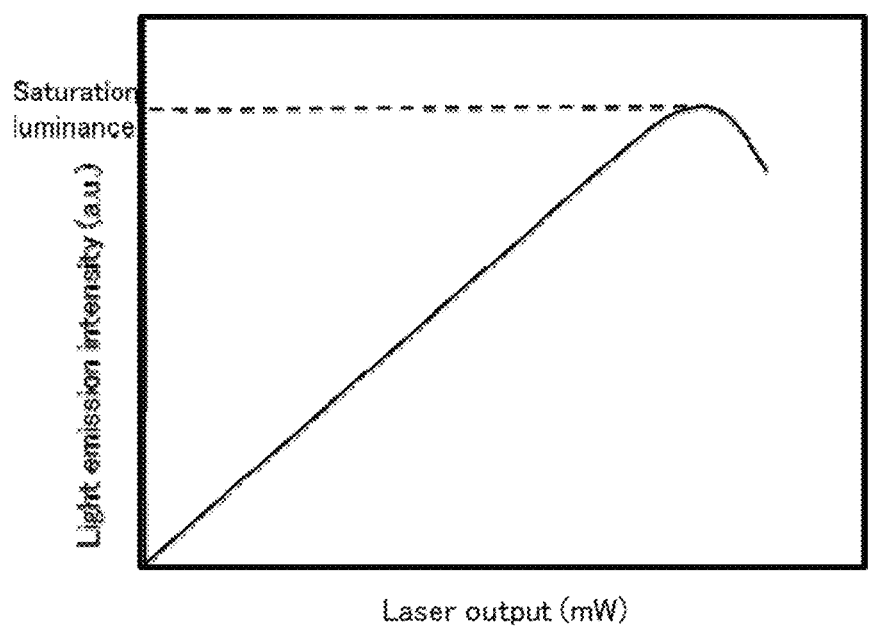
FIG. 5 is an image figure showing a relationship between an output of laser light (laser output) to be irradiated on a fluorescent material and a light emission intensity of the fluorescent material relative to an input of the laser light.

The sample containing the rare earth aluminate fluorescent material according to Example 1-2 and the sample containing the rare earth aluminate fluorescent material according to Comparative Example 1-2 were irradiated with laser light, which was emitted from a laser diode, having a wavelength of 455 nm and a spot diameter of 2.29×2.53 $mm^2$, and light emitted from each of the samples was detected with a photodiode through a cut filter, so that the light emission intensity of each of the samples respectively containing the rare earth aluminate fluorescent materials was measured with a photodiode monitor unit. The results are shown in FIG. 2.
SEM Micrograph The rare earth aluminate fluorescent material according to Example 1-2 and the rare earth aluminate fluorescent material according to Comparative Example 1-2 were respectively embedded in an epoxy resin, and these were cut such that a cross section of each of the rare earth aluminate fluorescent materials was exposed. Thereafter, the surfaces were polished with sandpaper, and then finished with a cross section polisher (CP), so that a scanning electron microscope (SEM) micrograph of the cross section of each of the rare earth aluminate fluorescent materials was obtained by using a SEM. FIG. 3 is a SEM micrograph showing a cross section of the rare earth aluminate fluorescent material according to Example 1-2, and FIG. 4 is a SEM micrograph showing a cross section of the rare earth aluminate fluorescent material according to Comparative Example 1-2.

TABLE 1

| | Raw material mixture | | | Composition | |
|---|---|---|---|---|---|
| | Charge-in composition | Parameter n | Parameter m | (analysis value) | Parameter n |
| Example 1-1 | $Y_{2.990}Ce_{0.010}Al_5Ga_{0.05}O_{12}$ | 0.003 | 0.010 | $Y_{2.991}Ce_{0.009}Al_{4.96}Ga_{0.03}O_{12}$ | 0.003 |
| Example 1-2 | $Y_{2.975}Ce_{0.025}Al_5Ga_{0.05}O_{12}$ | 0.008 | 0.010 | $Y_{2.978}Ce_{0.022}Al_{4.94}Ga_{0.03}O_{12}$ | 0.007 |
| Example 1-3 | $Y_{2.955}Ce_{0.045}Al_5Ga_{0.05}O_{12}$ | 0.015 | 0.010 | $Y_{2.962}Ce_{0.038}Al_{4.96}Ga_{0.03}O_{12}$ | 0.013 |
| Comparative Example 1-1 | $Y_{2.985}Ce_{0.015}Al_5Ga_{0.05}O_{12}$ | 0.005 | 0.010 | $Y_{2.986}Ce_{0.014}Al_{4.95}Ga_{0.05}O_{12}$ | 0.005 |
| Comparative Example 1-2 | $Y_{2.970}Ce_{0.030}Al_5Ga_{0.05}O_{12}$ | 0.010 | 0.010 | $Y_{2.974}Ce_{0.026}Al_{4.94}Ga_{0.03}O_{12}$ | 0.009 |
| Comparative Example 1-3 | $Y_{2.950}Ce_{0.050}Al_5Ga_{0.05}O_{12}$ | 0.017 | 0.010 | $Y_{2.953}Ce_{0.047}Al_{4.95}Ga_{0.05}O_{12}$ | 0.016 |

| | Parameter m | Parameter k | Light emission peak wavelength $\lambda p$ (nm) | Calculated value $1590n + 531$ | Average particle diameter (μm) |
|---|---|---|---|---|---|
| Example 1-1 | 0.006 | 0.998 | 537 | 536 | 24.0 |
| Example 1-2 | 0.006 | 0.994 | 544 | 543 | 23.5 |
| Example 1-3 | 0.006 | 0.998 | 555 | 551 | 25.0 |
| Comparative Example 1-1 | 0.010 | 1.000 | 537 | 538 | 22.5 |
| Comparative Example 1-2 | 0.006 | 0.994 | 544 | 545 | 20.5 |
| Comparative Example 1-3 | 0.010 | 1.000 | 555 | 556 | 23.5 |

As shown in Table 1, in the rare earth aluminate fluorescent material according to each of Examples 1-1 to 1-3, the parameter n obtained by dividing the molar ratio of Ce in the composition of the rare earth aluminate fluorescent material by the total molar ratio of Ce and Y, which was 3, was in a range of 0.003 or more and 0.017 or less, and the light emission peak wavelength $\lambda_p$ was larger than the calculated value obtained by substituting the parameter n in the expression of 1590n+531. In other words, in the rare earth aluminate fluorescent material according to each of Examples 1-1 to 1-3, the parameter n and the light emission peak wavelength $\lambda_p$ (nm) of the fluorescent material at an excitation wavelength of 450 nm satisfied the relational expression of $\lambda_p \geq 1590n+531$.

On the other hand, in the rare earth aluminate fluorescent material according to each of Comparative Examples 1-1 to 1-3, the parameter n obtained by dividing the molar ratio of Ce in the composition of the rare earth aluminate fluorescent material by the total molar ratio of Ce and Y, which was 3, was in a range of 0.003 or more and 0.017 or less, but the light emission peak wavelength $\lambda_p$ was smaller than the calculated value obtained by substituting the parameter n in the expression of 1590n+531. In other words, in the rare earth aluminate fluorescent material according to each of Comparative Examples 1-1 to 1-3, the relationship between the parameter n and the light emission peak wavelength $\lambda_p$ (nm) of the fluorescent material at an excitation wavelength of 450 nm was $\lambda_p < 1590n+531$, and thus the relational expression of $\lambda_p \geq 1590n+531$ was not satisfied.

FIG. 1 is a graph in which, in each of compositions of the rare earth aluminate fluorescent materials according to Examples 1-1 to 1-3, a relationship between the parameter n obtained by dividing the molar ratio of Ce by the total molar ratio of Y and Ce, which is 3, and the light emission peak wavelength $\lambda_p$ of each of the rare earth aluminate fluorescent materials is plotted; and is a graph in which, in each of compositions of the rare earth aluminate fluorescent materials according to Comparative Examples 1-1 to 1-3, a relationship between the parameter n obtained by dividing the molar ratio of Ce by the total molar ratio of Y and Ce, which is 3, and the light emission peak wavelength (nm) of each of the rare earth aluminate fluorescent materials is plotted. As shown in FIG. 1, even when the light emission peak wavelength $\lambda_p$ of each of the fluorescent materials at 450 nm is same as the values at 537 nm, 544 nm, and 555 nm, the molar ratio of Ce in the composition of the rare earth aluminate fluorescent material according to each of Examples is smaller than that of the rare earth aluminate fluorescent material according to each of Comparative Examples. Thus, by decreasing the molar ratio of Ce, the saturation luminance can be improved. In the rare earth aluminate fluorescent material according to each of Examples, even when the molar ratio of Ce in the composition of the fluorescent material is smaller than the molar ratio of Ce of the rare earth aluminate fluorescent material according to each of Comparative Examples, the light emission peak wavelength may never be shorten.

FIG. 2 is a graph showing, with respect to the rare earth aluminate fluorescent material according to Example 1-2 and the rare earth aluminate fluorescent material according to Comparative Example 1-2, a relationship between an output of laser light (LD output) to be irradiated on the fluorescent material and a light emission intensity of each of the fluorescent materials. As shown in FIG. 2, the rare earth aluminate fluorescent material according to Example 1-2 has linearly high growth of the light emission intensity relative to a laser output to be irradiated on the fluorescent material and higher saturation luminance, as compared with the rare earth aluminate fluorescent material according to Comparative Example 1-2.

FIG. 3 is a SEM micrograph showing a cross section of the rare earth aluminate fluorescent material according to Example 1-2. As shown in FIG. 3, in the rare earth aluminate fluorescent material according to Example 1-2, the first calcined product obtained by the first calcination step becomes a core, and the second layered calcined product is formed around the first calcined product serving as the core by two times of the second calcination steps. As shown in the SEM micrograph of FIG. 3, in a cross sectional view of the fluorescent material particles, the rare earth aluminate fluorescent material according to Example 1-2 has three layers containing a core, a first layer, and a second layer, and color of the boundaries among the layers becomes dark. As shown in the SEM micrograph of FIG. 3, in a cross sectional view of the fluorescent material particles, the core, the first layer, and the second layer of the rare earth aluminate fluorescent material according to Example 1-2 can be distinguished, but large color gradations other than the boundaries among the core, the first layer, and the second layer, cannot be confirmed. Accordingly, it can be presumed that the core, the first layer, and the second layer of the rare earth aluminate fluorescent material according to Example 1-2 are uniform.

FIG. 4 is a SEM micrograph showing a cross section of the rare earth aluminate fluorescent material according to Comparative Example 1-2. As shown in FIG. 4, in the cross section of the rare earth aluminate fluorescent material according to Comparative Example 1-2, a part where the color is changed can be confirmed in the SEM micrograph, and thus it is presumed that the particles are not uniform.

In combination with a light emitting element such as a LED or a LD, the rare earth aluminate fluorescent material according to the embodiment of the present invention or the rare earth aluminate fluorescent material obtained by the production method can be utilized for light emitting devices for in-car and general lighting, backlights of liquid crystal display devices, and light source devices for projectors.

The invention claimed is:

1. A method for producing a rare earth aluminate fluorescent material, comprising:
 first calcining a first raw material mixture to obtain a first calcined product,
 in which the first raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, and adjusting a charge-in composition for the first raw material mixture to be a composition represented by the following formula (I-2);

$$(Ln_{1-n}Ce_n)_3(Al_{1-m}M1_m)_5O_{12} \qquad (I-2)$$

wherein Ln represents at least one rare earth element selected from the group consisting of Y, La, Lu, Gd, and Tb, M1 represents at least one element selected from Ga and Sc, and parameters n and m each satisfy $0.003 \leq n \leq 0.017$ and $0 \leq m \leq 0.02$, and
 at least one time of second calcining a mixture to obtain a second calcined product,
 wherein the mixture contains the first calcined product and a second raw material mixture obtained by mixing a compound containing at least one rare earth element Ln selected from the group consisting of Y, La, Lu, Gd, and Tb; a compound containing Ce; a compound containing Al; and optionally a compound containing at least one element M1 selected from Ga and Sc, adjusting a charge-in composition for the second raw material mixture to be the composition represented by the formula (I-2) and mixing to have the same charge-in composition as the first raw material mixture.

2. The method for producing the rare earth aluminate fluorescent material according to claim 1, comprising subjecting the first calcined product and/or the second calcined product to an acid washing treatment.

3. The method for producing the rare earth aluminate fluorescent material according to claim 1, wherein the first raw material mixture in the first calcining and/or the second raw material mixture in the second calcining comprises a compound containing at least one element selected from the group consisting of Ba, Sr, Ca, Mg, and Mn as a flux in an amount of 0.5% by mass or more and 10% by mass or less.

4. The method for producing the rare earth aluminate fluorescent material according to claim 1, wherein, in the first calcining and/or the second calcining, the calcination temperature is 1,400° C. or more and 1,800° C. or less, and the calcination time is 5 hours or more and 20 hours or less.

5. The method for producing the rare earth aluminate fluorescent material according to claim 1, wherein the atmosphere in the first calcining and/or the second calcining is a reducing atmosphere.

6. The method for producing the rare earth aluminate fluorescent material according to claim 1, wherein the second calcined product obtained by the second calcining is formed as a layered calcined product, and the first calcined product is used as a core.

7. The method for producing the rare earth aluminate fluorescent material according to claim 1, wherein the second calcining is repeated more than once.

8. The method for producing the rare earth aluminate fluorescent material according to claim 1, wherein a mass ratio of at least one of the first calcined product and the second calcined product to 100% by mass of the second raw material mixture is in a range of 20% by mass or more and 83% by mass or less in the second calcining.

* * * * *